United States Patent [19]

Ogden

[11] 4,065,109

[45] Dec. 27, 1977

[54] TORCH CUTTING MACHINE AND DRIVE CONTROL ARRANGEMENT THEREFOR

[76] Inventor: Ralph Ogden, 1304 Fisher St., Munster, Ind. 46321

[21] Appl. No.: 754,361

[22] Filed: Dec. 27, 1976

[51] Int. Cl.² ............................................. B23K 7/10
[52] U.S. Cl. ................................ 266/69; 104/147 R; 104/165; 105/29 R; 105/163 R
[58] Field of Search .................................. 266/67–68, 266/69; 104/98, 147 R, 165; 105/29 R, 26 A, 26 B, 63, 163 R, 163 SK

[56] References Cited

U.S. PATENT DOCUMENTS

| | | | |
|---|---|---|---|
| 1,746,208 | 2/1930 | Alexander | 266/58 X |
| 3,172,938 | 3/1965 | Schwartz | 266/67 X |
| 3,204,577 | 9/1965 | Smith | 105/163 R |
| 3,990,520 | 11/1976 | Koch et al. | 91/189 R X |

*Primary Examiner*—Roy Lake
*Assistant Examiner*—Paul A. Bell
*Attorney, Agent, or Firm*—McWilliams & Mann

[57] ABSTRACT

A torch cutting machine having a hydraulic motor drive and a hydraulic system for actuating the drive, which system includes a hydraulic liquid flow orienting valve for controlling the direction of movement of the drive, in which the control arrangement for each hydraulic motor involved comprises a stepping or pulse motor assembly mounted on the machine frame for free floating shifting movement longitudinally of the machine trackway, a rack made fast to and extending the length of the trackway, with the stepping motor assembly including a stepping motor and mounting a gear that is driven in forward and reverse directions by the stepping motor and is in rolling meshing torque transmitting relation with the rack. The hydraulic liquid flow orienting valve is in the form of a servo valve secured to the machine frame and having its operating spool connected to the stepping motor assembly for movement thereby. When the stepping motor is driven it effects actuation of the machine hydraulic motor drive it controls by appropriately positioning the servo valve without the stepping motor involved being a direct part of the machine driving mechanism. The disclosure also illustrates the drive control involved as applied to machine tool operation.

12 Claims, 9 Drawing Figures

TORCH CUTTING MACHINE AND DRIVE CONTROL ARRANGEMENT THEREFOR

This invention relates to torch cutting machines and the like, and more particularly to drive control arrangements for machines of this type.

Conventional torch cutting machines of the gantry type operate along side of or over the metal plating to be cut by the torch or torches carried by the machine. The machine is typically operated along a trackway defined by rails equipped with a stationary rack extending longitudinally of same, with the machine being moved along the trackway by a stepping or pulse motor drive arrangement, or more typically, a DC servomotor arrangement, that involves gearing driven by the motor meshing with the rack. As equipment of this type involves considerable mass to be moved, the driving of motors and rack involved and the mounting arrangements therefor are subjected to considerable stress and strain in overcoming the inertia that is involved in the starting and stopping movement of the machine. Thus, where conventional arrangements call for the pulse or stepping motors to be used for this application they must be large, strongly built, and firmly mounted in operating position on the machine frame; moreover, the rack must be built and installed with the full stress and strain it will be subjected to in mind.

Furthermore, difficulties in accurately controlling the mass of the machine to be moved and stopped introduces inaccuracies in the physical cutting of the plates involved, which makes precise cutting difficult to effect.

A principal object of this invention is to provide a torch cutting machine having a direct hydraulic motor drive which is controlled by a stepping or pulse motor arrangement that does not itself drive or move the cutting machine, but rather cooperates with the trackway rack to operate a servo valve that serves as the off-on control for the hydraulic drive.

Another and more general object of the invention is to provide a drive control arrangement of general application whereby a stepping or pulse motor driving action is operative to effect off-on and directional control positioning of a servo valve for prime mover control purposes without the stepping motor having to also serve as the prime mover.

Another important object of the invention is to provide a hydraulically driven torch cutting machine in which the high torque requirements to start and stop the machine are provided by a suitable hydraulic motor arrangement, with the operation of the hydraulic motor or motors involved being controlled by stepping motor actuated, direct acting servo valve arrangements, whereby the stepping motor power requirements are dictated by what is needed to operate the servo valve, as distinguished from the entire mass of the machine and the equipment it carries.

Other objects of the invention are to provide a hydraulically driven torch cutting machine equipped with a drive control permitting the use of small low powered stepping or pulse motors, to provide a torch cutting machine freed of cutting inaccuracies that have been troublesome factors in the use of conventional torch cutting machines, to provide a hydraulically driven motor control arrangement adapted for ready application to other types of equipment arranged to be moved along a trackway, and to provide a torch cutting machine that is economical of manufacture, convenient to install, and efficient and long lived in operation.

In accordance with the disclosure, a specific application of the invention is illustrated in connection with torch cutting machines in which a torch cutting machine having a hydraulic motor driven drive and a hydraulic system for actuating same is provided that includes a hydraulic liquid flow orienting valve arrangement for controlling the direction of movement of the drive, in which the control arrangement for each hydraulic motor involved in the drive comprises a stepping or pulse motor assembly mounted on the machine frame for free floating shifting movement longitudinally of the machine trackway, a rack made fast to and extending the length of the trackway, with the stepping or pulse motor assembly including a stepping motor and mounting a gear that is driven in forward and reverse directions by the stepping motor and is in rolling torque transmitting relation with the rack. The hydraulic liquid flow orienting valve arrangement is in the form of a servo valve for each hydraulic motor involved arranged to control the direction of operation of same, which valve is secured to the frame and has its operating spool connected to the stepping motor assembly it is associated with for movement thereby. When the stepping motor of the respective stepping motor assemblies is driven, it effects actuation of the machine hydraulic motor controlled by the servo valve in question, by appropriately positioning the servo valve without the stepping motor being a direct part of the machine driving mechanism.

Thus, the directional hydraulic pressure liquid flow control valve employed for each hydraulic motor involved in driving the machine is operated by the stepping or pulse motor involved, rather than such stepping or pulse motor directly driving the machine itself. Consequently, the stepping motor power and manner of securement requirements are dictated by what is needed to operate the servo valve, as distinguished from the entire mass of the machine as a whole and the equipment it carries.

The disclosure also illustrates the application of the stepping motor drive control in connection with machine tool applications wherein the relative movable tool component is drive controlled in accordance with the invention. The disclosure also brings out that the hydraulic drive employed can involve several or all of the drive motors employed controlled in parallel from a single stepping motor assembly arranged as indicated.

Other objects, uses, and advantages will be apparent or become obvious from a consideration of the following detailed description and the application drawings in which like reference numerals indicate like parts throughout the several views.

However, it is to be distinctly understood that the specific drawing illustrations provided are supplied primarily to comply with the requirements of the Patent Laws, and that the invention is susceptible of other embodiments that will be obvious to those skilled in the art, and that are intended to be covered by the claims appended hereto.

Figure 1:
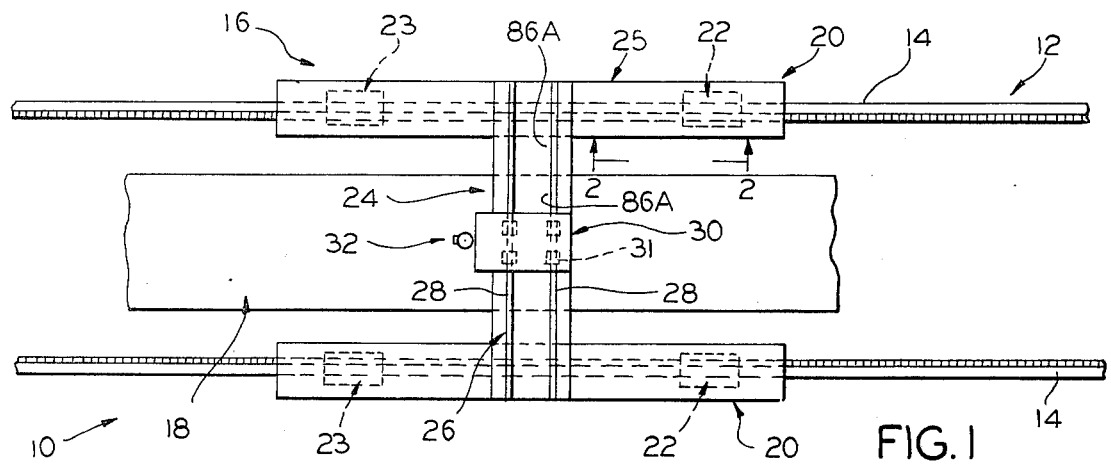
FIG. 1 is a diagrammatic plan view illustrating a typical application of the invention for torch cutting procedures.

Reference numeral 10 of FIG. 1 generally indicates as a whole a torch cutting apparatus to which the invention is applied, which comprises a trackway 12 defined by a pair of track rails 14 on which rides a gantry type flame cutting machine generally indicated by reference numeral 16, which is arranged for flame cutting of a metal plate 18 suitably supported between the track rails 14 in a horizontal position, in accordance with conventional procedures.

The flame cutting machine 16, which is only diagrammatically illustrated, and is intended only to represent a familiar type of basic flame cutting machine, is shown to comprise a pair of trucks 20 each having a pair of wheels 22 and 23 of the usual flanged type for riding on the rails 14.

The trucks 20 are connected together by a bridge structure 24 to form a wheeled frame 25 on which is mounted a trackway 26 extending crosswise or transversely of the trackway 12 and is defined by suitable rails 28 applied to the bridge structure 24 on which rides a trolley or carriage 30 having suitable wheels 31 engaging the rails 28. The trolley or carriage 30 operably mounts a flame cutting torch arrangement indicated by reference numeral 32 which, for purposes of this invention, may be of any suitable type, but preferably is that disclosed in my application Ser. No. 701,368, filed June 30, 1976 (the entire disclosure of which is incorporated herein by this reference).

Figures 3, 4:
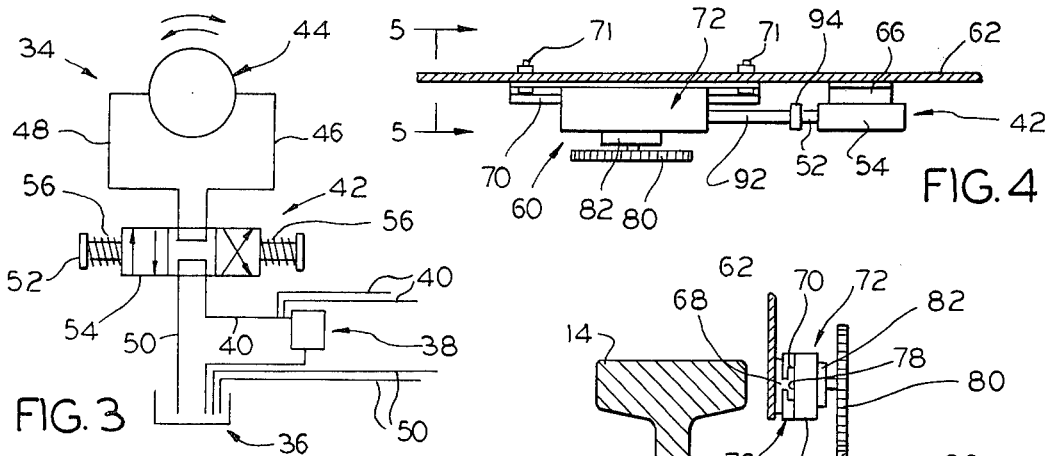
FIG. 3 is a diagram illustrating a typical hydraulic circuit suitable for use in practicing the form of the invention of FIGS. 1 and 2.
FIG. 4 is a fragmental horizontal sectional view taken substantially along line 4—4 of FIG. 2.

In accordance with the present invention, the wheels 22 of each truck 20, are hydraulically driven utilizing the hydraulic system 34 that is diagrammatically illustrated in FIG. 3 whereby hydraulic pressure liquid is drawn from tank 36 by suitable hydraulic pump 38 and supplied through pressure lines 40 to a four way control valve 42 for each hydraulic motor 44 driving a wheel 22. The respective valves 42 are connected to the respective motors by hydraulic conduits 46 and 48 and the hydraulic pressure liquid returns to tank from the respective valves 42 through the respective conduits 50.

The hydraulic motors 44 may be conveniently built into the respective drive wheels 22 in any convenient manner, such as shown in FIG. 10 of U.S. Pat. No. 3,046,950. Alternately they may be standard hydraulic motors suitably coupled to wheels 22 through a suitable gear reducer.

Further in accordance with the invention, the four way control valves 42 are of the direct acting servo or tracing type which preferably have the general arrangement illustrated in FIG. 3 wherein spool 52 operates in suitable housing 54 that is biased to the null position of the valve in any suitable manner. In the form shown, oppositely acting compression springs 56 acting between the valve housing 54 and the spool 56 in the manner diagrammatically illustrated in FIG. 3 to serve this purpose, though other equivalent biasing arrangements will be satisfactory.

Further in accordance with the invention, the valve 42 for the respective drive wheels 22 is suitably secured to the truck 20 in which the wheel 22 is mounted, with the respective valves 42 being oriented to have their spools 52 extend longitudinally of the trackway 12.

Figure 2:
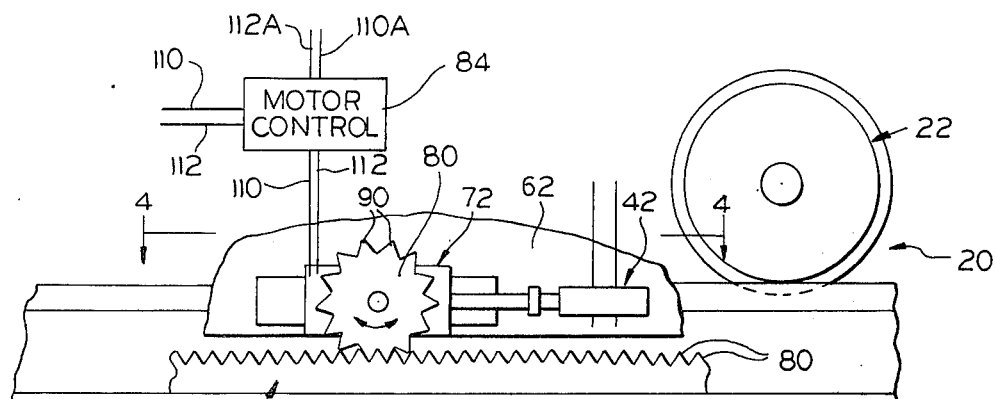
FIG. 2 is a diagrammatic fragmental side elevational view of a portion of one of the machine trucks and associated parts, with parts broken away and illustrating the principal components of the invention, and taken substantially along line 2—2 of FIG. 1.

Also in accordance with the invention, the spool 52 of each valve 42 is connected to a stepping or pulse motor assembly 60 mounted for free floating rectilinear shifting movement longitudinally of the trackway 12 and horizontally aligned with the adjacent valve 42, as indicated in FIGS. 2 and 4.

For this purpose, the valve 42 of each truck is secured to a support plate 62 or the like (that is suitably fixed to the respective trucks 20 or forms a part of same), as by providing the valve housing 54 with a suitable bracket structure 66 that is in turn suitably fixed to the support plate 62.

Figure 5:
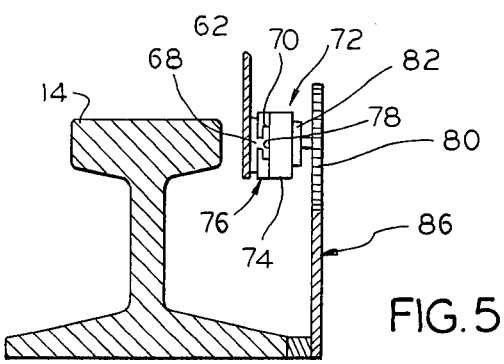
FIG. 5 is a fragmental vertical sectional view taken substantially along line 5—5 of FIG. 4.

The support plate 62 has suitably fixed thereto horizontally extending slide bar 68, which may be shaped as indicated in FIG. 5 to define a track portion 70 on which the assembly 60 is shiftably mounted. Bar 68 may be formed from a self lubricating plastic material such as ultra high molecular weight polyethylene, and may be secured in place by suitable bolts 71.

The assembly 60 comprises a stepping or pulse motor 72 of any suitable type which in the form illustrated has a housing 74 provided with a side plate structure 76 shaped to define the slideway 78 in which the track portion 70 of slide bar 68 is received.

The stepping motor assembly 60 suitably journals drive gear 80 which is driven by the stepping motor 72, through suitable gear reducer 82, for rotation in either direction. Suitable motor control 84 controls the operation of motor 72.

Gear 80 of the respective assemblies 60 is in meshing torque transmitting relation with the respective racks 86 that are mounted along the trackway 12 adjacent the respective rails 14 in any suitable manner, as by being suitably welded to the rails 12. The racks 86 are coextensive with the 12 and are formed with suitable rack teeth 88 shaped to suitably mesh with gear teeth 90 of the respective gears 80.

Further in accordance with the invention, the valve 42 and step motor assembly for the respective drive wheels 22 are connected together in any suitable manner, such as that diagrammatically illustrated in FIGS. 2 and 4 wherein the assembly 60 has a bar or rod 92 fixed thereto in axial alignment with the spool 52 of the adjacent valve 42 and coupled thereto by suitable connecting device 94.

The power feed lines (represented in FIG. 2 by lines 110 and 112) of both the stepping motors 72 are operably connected to the motor control 84 for simultaneous actuation of motors 72 thereby when the wheeled frame 25 is to be moved longitudinally of trackway 12. While the frame 25 remains stationary with respect to trackway 12, the spools 52 of the respective valves 42 remain in their null positions that are illustrated in FIG. 3 under the bias that is suitably built into the valves 42 in any conventional manner, such as that indicated in FIG. 3. Assuming it is desired to move the frame 25 to the left of FIG. 1, the motor control 84 is suitably actuated to drive the respective gears 80 (of trucks 20) in a clockwise direction, whereby the gears 80 roll in torque transmitting relation to the respective racks 86 thereby shifting the respective assemblies 60 longitudinally of and to the left of the respective slide bar 68 whereby the respective spools of valve 42 are shifted from their null positions a corresponding amount to drive the drive wheels 22 in the corresponding direction.

When the frame 25 is to be moved in the opposite direction, the stepping motors 72 are driven in the opposite direction by suitable operation of the motor control 84.

The motor control 84 is shown in block diagram only as it may be of any suitable conventional type. NC (numerically controlled) controllers are frequently used for machine control, which involve the machine operating sequence being presented to control by a punched control tape, and manual control of pulses and speed. Motor control 84 can be fully manually operated though it can also be arranged to although include a suitable programmable controller mechanism for automatically operating the apparatus 10 in steps according to a preselected cycle.

Figure 6:
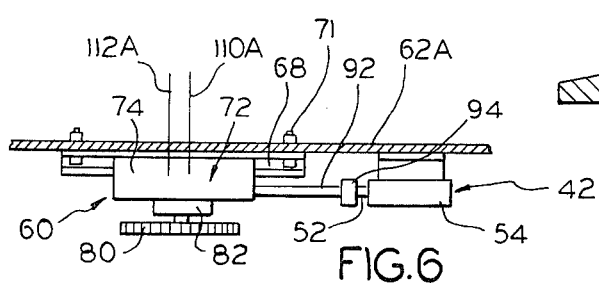
FIG. 6 is a view similar to that of FIG. 4 but illustrates the drive control mounting arrangement for the torch cutting machine trolley.

It is also a feature of the invention that the trolley 30 be driven with respect to its trackway 26 in the same manner as the frame 25 is driven with respect to its trackway 12. For this purpose the trolley 30 is equipped to drive one of its wheels 31 in the same manner as the drive wheels 22 of frame 25 are driven. For this purpose the trolley 30 is equipped with a valve 42 forming a part of the hydraulic system 34 and operably associated with a stepping motor assembly 60 mounted on the trolley 30 in the manner indicated in FIGS. 2, and 4-6 in operative association with a rack 86A mounted along one of the rails 28. Again, the valve 42 controlling the drive wheel 31 of trolley 30 is connected to the said drive wheel 31 (which may be arranged in the same manner as the drive wheels 22), with such valve 42 being suitably connected to a source of hydraulic pressure liquid under pressure and tank by a set of the indicated supply and return conduits 40 and 50 of FIG. 3. The power feed lines represented by lines 110A and 112A for the stepping motor 72 that actuates the drive wheel 31 of trolley 30 are suitably connected to motor control 84 for actuation thereby in coordination with the stepping motors 72 for drive wheels 22 utilizing suitable programmable control techniques. The trolley 30 includes support plate 62A on which the trolley valve 42 and stepping motor assembly 60 are mounted (see FIG. 6).

In accordance with the invention, after the plate 18 to be torch cut, as by using suitable flame cutting or plasma cutting equipment, is suitably mounted in cutting position between rails 14, the frame 25 is moved longitudinally of its track rails 14, and the trolley 30 is moved longitudinally of its track rails 28, by suitably operating the motor control apparatus 84 to drive the respective stepping motors 72 in the appropriate directions, in accordance with the shaping to be made on the plate 18, as may be dictated by the programmable controller that is preferably integrated with the motor control 84.

Thus, when the frame 25 is to be moved either to the right or to the left of FIGS. 1 and 2, the stepping motors 72 for the respective drive wheels 22 are driven in the appropriate direction to roll the respective gears 80 along their respective racks 86, whereby the assemblies 60 that are operatively mounted on the respective trucks 20 are shifted in the appropriate direction, longitudinally of the trackway 12, to shift the respective spools 52 of the respective valves 42 in the appropriate direction to actuate the respective hydraulic motors 44 to drive the frame 25 in one direction longitudinally of the trackway 12, and at the speed dictated by the speed of operation of the stepping motors 72 of the respective trucks 20.

Similarly, the trolley 30 is moved longitudinally of its trackway 26 in the direction desired under the guidance of the motor control apparatus 84 through operation of the stepping motor 72 of trolley 30 to shift the spool 52 of the valve 42 controlling the operation of the trolley drive wheel 31 to provide the trolley 30 with the movement desired of same transversel of trackway 12.

The movement of the frame 25 longitudinally of the trackway 12 and the movement of the trolley 30 longitudinally of its trackway 26 are proportioned to effect the desired cutouts in plate 18, as may be dictated by appropriate operation of the programmable controller that is integrated with the motor control 84.

It will thus be seen that in accordance with this invention, the gantry frame 25 is not actuated directly by its stepping motor 72, but rather by its drive motors 22 under the biasing action applied to the fourway control valves 42 serving as the hydraulic pressure liquid flow orienting or directional flow control valves for the respective motors 22.

As the stepping motors 72 only have the function of shifting the mass of the respective assemblies 60 and the spool 52 such assemblies 60 are connected to, the stepping motors 72 may be in the form of small low powered electric stepping motors. Conventional hydraulic drive motors that are adapted to handle the inertias involved in starting and stopping the mass represented by frame 25 and the equipment it carries are commercially available in power capacities quite adequate to handle the power needs involved.

Alternately, both wheels 22 and 23 of each truck may be drive wheels using hydraulic motors of the type indicated controlled in parallel by a single control valve 42 having a motor assembly 60 operably associated therewith in the manner that has been disclosed. Similarly, one or all of the wheels of both trucks may be similarly controlled in parallel, especially in situations where the distance between rails 14 is markedly narrow in relation to the length of the wheeled frame being moved.

Figure 7:
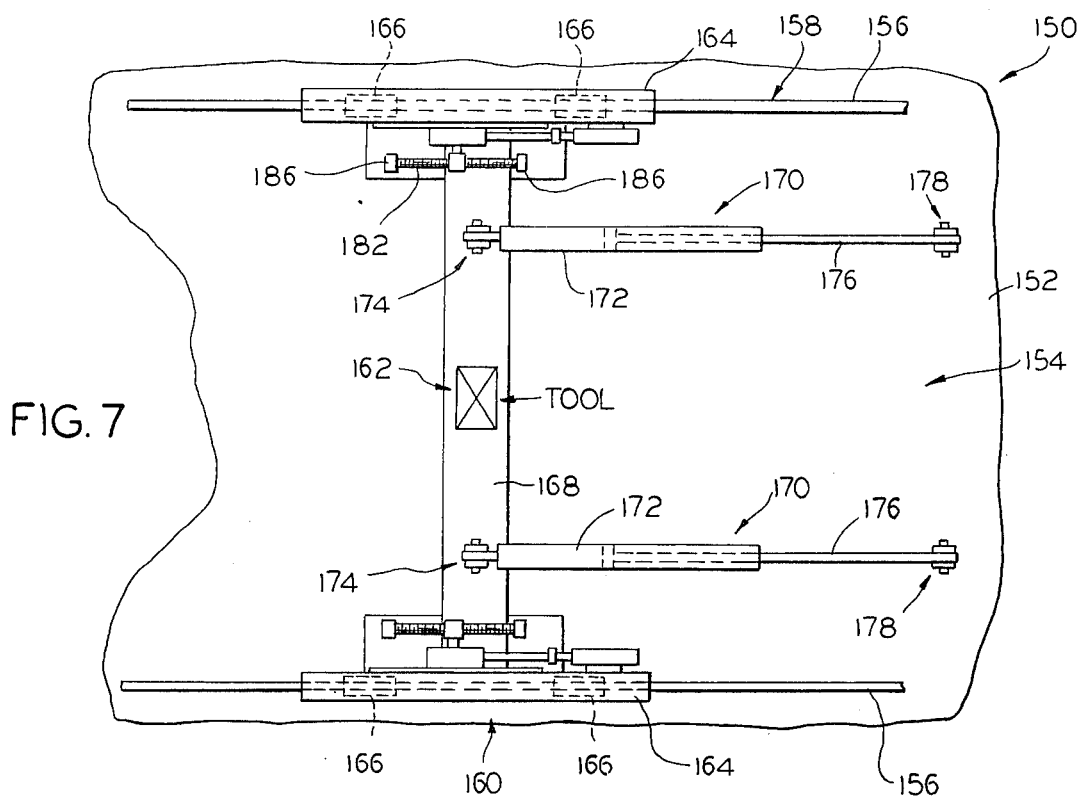
FIG. 7 is a diagrammatic plan view illustrating the drive control aspects of the invention applied to a machine tool assembly.
Figure 8:
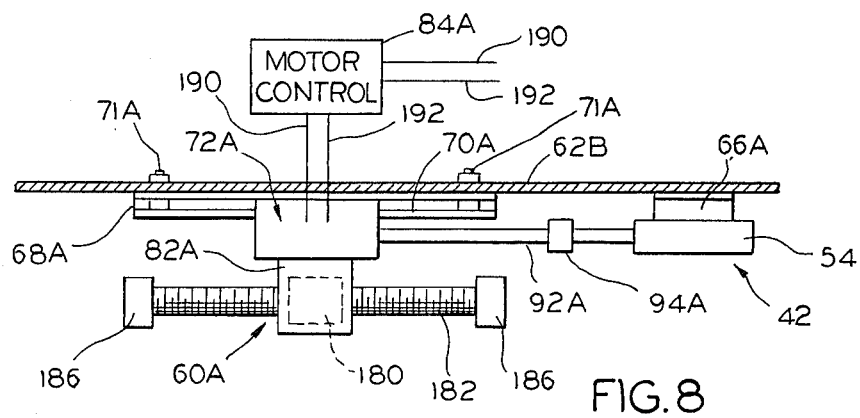
FIG. 8 is a view similar to that of FIGS. 4 and 6 but illustrating the drive control components as applied to the machine of FIG. 7.
Figure 9:
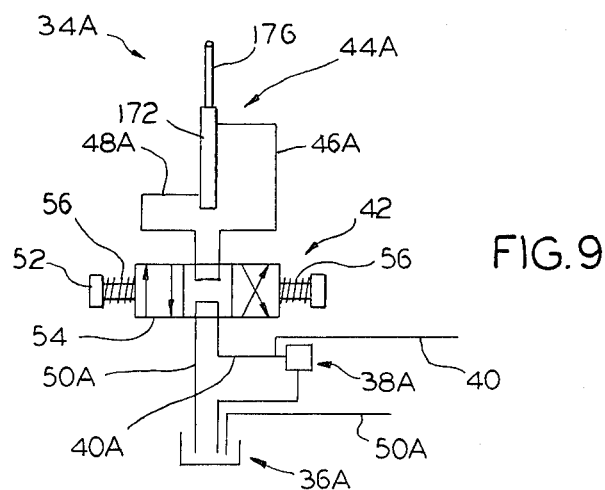
FIG. 9 is a diagram illustrating a typical hydraulic circuit for practicing the form of the invention of FIGS. 7 and 8.

In the showing of FIGS. 7-9, a machine tool assembly 150 is diagrammatically illustrated comprising a suitable frame 152 defining a bed 154 mounting a pair of spaced rails 156 defining a rectilinear trackway 158 on which is mounted a movable frame 160 carrying a suitable machine tool indicated at 162 that is to be moved in either direction longitudinally of trackway 158. It is assumed that tool 162 is to perform a metal working operation requiring forward and return movements of frame 160, such as grinding, or honing, or chip removal.

For illustrative purposes, frame 160 is shown as comprising a pair of trucks 164 each riding on flanged wheels 166 that in turn ride on the respective rails 156. Trucks 164 are joined together by bridge structure 168 on which tool 162 is suitable mounted. Frame 160 is moved longitudinally of its trackway by a pair of hydraulic cylinder devices 170 each including hydraulic cylinder 172 pivotally connected to the bridge structure as at 174 and reciprocably receiving piston rod 176 in turn pivotally connected to the bed as at 178. Hydraulic cylinder devices 170 are double acting and are actuated utilizing the hydraulic system 34A that is diagrammatically illustrated in FIG. 9 whereby hydraulic pressure liquid is drawn from tank 36A by suitable hydraulic pump 38A and supplied through pressure lines 40A to a four way control valve 42 for each hydraulic cylinder 172 driving a wheel 22. The respective valves 42 are connected to the respective cylinders by hydraulic conduits 46A and 48A and the hydraulic pressure liquid returns to tank from the respective valves 42 through the respective conduits 50A.

The four way control valves 42 are the same as valves 42 of FIGS. 1–6 and thus are of the direct acting servo or tracing type which preferably have the general arrangement illustrated in FIG. 3 (as indicated by corresponding reference numerals).

In accordance with the invention, the valve 42 for the respective cylinders 172 is suitably secured to the truck 164 adjacent same, with the respective valves 42 being oriented to have their spools 52 extend longitudinally of the trackway 158.

As in the embodiment of FIGS. 1–6, the spool 52 of each valve 42 is connected to a stepping or pulse motor assembly 60A mounted for free floating rectilinear shifting movement longitudinally of the trackway 158 and horizontally aligned with the adjacent valve 42, as indicated in FIGS. 7 and 8.

For this purpose, the valve 42 of each truck 164 is secured to a support plate 62B or the like (that is suitably fixed to the respective trucks 164 or forms a part of same), as by providing the valve housing 54 with a suitable bracket structure 66A that is in turn suitably fixed to the support plate 62B.

The support plate 61B has suitably fixed thereto horizontally extending slide bar 68A, which may be shaped in the same manner as slide bar 68 of FIGS. 1–6 to define a track portion 70A on which the asssembly 60A is shiftably mounted. Bar 68A may be formed from a self lubricating plastic material such as ultra high molecular weight polyethylene, and may be secured in place by suitable bolts 71A.

Each assembly 60A comprises a stepping or pulse motor 72A of any suitable type which in the form illustrated has a housing 74A provided with a side plate structure 76A shaped in the same manner as corresponding plate structure 76 of FIGS. 1–6 to define the slideway in which the track portion 70 of slide bar 68 is received.

Each stepping motor assembly 60A suitably journals rotating nut structure 180 which is driven by the stepping motor 72, through suitable gear reducer 82A, for rotation in either direction. Suitable motor control 84A controls the operation of motor 72.

Nut structure 180 of the respective assemblies 60A may be of the type shown in Stanley U.S. Pat. No. 3,965,761 (see FIG. 5), and is in meshing torque transmitting relation with the respective threaded shafts 182 that are suitably fixedly mounted on the bridge structure 168 adjacent the respective trucks 164 in any suitable manner, as by being applied between and keyed to the spaced fixed supports 186. The shafts 182 and the nut structures 180 respectively engaging same have the threaded cooperation of the type disclosed in said Stanley patent whereby rotation of the nut structures 180 in either direction on their respective shafts effects linear movement of the respective assemblies 60A relative to frame 160.

Further in accordance with the invention, the valve 42 and step motor assembly 60A for the respective cylinders 172 are connected together in any suitable manner, such as that diagrammatically illustrated in FIG. 9 wherein the assembly 60A has a bar or rod 92A fixed thereto in axial alignment with the spool 52 of the adjacent valve 42 and coupled thereto by suitable connecting device 94A.

The power feed lines of both the stepping motors 72 (of frame 160) represented by lines 190 and 192 are operably connected to the motor control 84A for simultaneous actuation thereby when the frame 160 is to be moved longitudinally of trackway 158. While the frame 160 is to remain stationary with respect to trackway 158, the spools 52 of the respective valves 42 remain in their null positions that are illustrated in FIG. 9 under the bias that is suitably built into the valves 42 in any conventional manner, such as that indicated in FIGS. 3 and 9. Assuming it is desired to move the frame 160 relative to frame 152, the motor control 84A is suitably actuated to actuate motors 72 to rotate the respective nuts 180 (of trucks 20) in the direction that feeds the nuts 180, and thus the respective assemblies 60A, in the direction relative to frame 160 whereby the respective spools of valves 42 are shifted from their null positions a corresponding amount to actuate hydraulic cylinders 172 for moving frame 160 in the corresponding direction relative to frame 152.

When the frame 160 is to be moved in the opposite direction, the stepping motors 72 are driven in the opposite direction by suitable operation of the motor control 84A.

The motor control 84A (like motor control 84) is shown in block diagram only as it may be of the type described in connection with control 84 to provide for sequentially driving stepping motors 72 in forward and reverse directions in a synchronous manner to provide for simultaneous and synchronous operation of hydraulic cylinders 172. Thus, in the embodiment of FIGS. 7–9, when the frame 160 is to be moved either to the right or to the left of FIG. 7, the stepping motors 72 for the respective hydraulic cylinders 172 are driven in the appropriate direction to rotate nut structures or assemblies 180 for threading movement along their respective threaded shafts 182, whereby the assemblies 60A that are operatively mounted on the frame 160 are shifted in the appropriate direction, longitudinally of the trackway 158, to shift the respective spools 52 of the respective valves 42 (of assemblies 60A) in the appropriate direction, longitudinally of the trackway 158, to shift the respective spools 52 of the respective valves 42 (of assemblies 60A) in the appropriate direction to actuate the respective hydraulic cylinders 160 to move the frame 25 in the desired direction longitudinally of the trackway 158, and at the speed dictated by the speed of operation of the stepping motors 72 of assembly 150.

While frame 160 is shown for illustrative purposes to be wheel mounted on trackway 158, frame 160 may be slidably mounted on a slideway formed by bed 154. Also, the cylinder devices 170 may be controlled in parallel by a single valve 42 and cooperating assembly 60A. It will be apparent also that in assemblies 60A the stepping motor may be arranged to rotate a screw member that is threadedly engaged with a stationary nut, instead of using the rotating nut-stationary shaft approach represented by nut structure 180 and shaft 182.

Furthermore, the drive assembly 60 and cooperating rack arrangement of FIGS. 1–6 may be applied to machine tool drive arrangements of the types represented by FIGS. 7–9.

It will be apparent that in both the illustrated embodiments, the mechanisms driven by the stepping motors involved comprise motion translating devices that translate the driving action of the stepping motors into movement of the stepping motor assemblies involved longitudinally of the respective trackways to in turn operate the hydraulic power supplying mechanisms involved to provide the desired movement of the movable frame which each embodiment is concerned. The controlling motion provided by the stepping motors can be closely controlled using suitable motor control arrangements which are preferably actuated using programmable controller techniques.

It will therefore be seen that the invention provides, in a hydraulic drive arrangement for gantry cranes and the like, a drive control in which the movement control that is desirably achieved by stepping or pulse motors can be provided using small low power units, as the mass to be moved along the trackway is driven by conventional hydraulic motors that are readily available to provide the power requirements and firm securement needed to achieve this end. Thus, the driving of the torch cutting equipment along its trackway is achieved by conventional hydraulic drive motors to the exclusion of the movement controlling stepping motors, which while having the functions of controlling the direction and speed of movement of the movable frames involved, do not also have to supply the needed driving power needed to move the equipment involved along the respective trackways.

It will be apparent that these aspects of the invention are applicable to a wide variety of other types of equipment where a frame is to be moved along a trackway in a predetermined manner, as is made clear by the embodiment of FIGS. 7–9.

With reference to valves 42, all movement of spools 52 away from and back to their null positions may be effected by suitable controlled operation of motors 72 and 72A through the respective controls 84 and 84A, thus making springs 56 unnecessary. Couplings 94 and 94A may be eliminated by retaining one of the springs 56 and operating motors 72 and 72A accordingly as required, through controls 84 an 84A, to move spools 56 away from, back to, and hold same at, the null position to achieve the operation described hereinbefore.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. In a wheeled frame riding on a trackway and having at least one of its wheels driven by hydraulic motor means, and a hydraulic system for actuating said motor means including a hydraulic liquid flow orienting means for controlling the flow of hydraulic liquid to and from the motor means, a drive control arrangement for controlling the operation of said flow orienting means and comprising:

a stepping motor assembly mounted on said frame for free floating shifting rectilinear movement longitudinally of the trackway and including a stepping motor, a rack extending longitudinally of the trackway and made stationary with respect thereto, a gear driven by said motor and carried by said motor assembly, said gear being in meshing relation with said rack for rolling movement along said rack when said stepping motor is driven to drive said gear, said flow orienting means comprising a flow orienting valve including a housing made fast to said frame, a flow orienting valve member mounted in said housing and movable between null and hydraulic motor driving positions, and means for biasing said valve member to its said null position, with said valve member being connected to said stepping motor assembly for movement thereby when said stepping motor assembly is moved relative to said frame under the action of said gear rolling on said rack when said gear is driven by said motor, and means for driving said stepping motor, whereby when said stepping motor is at rest, said valve member is in its null position precluding driving of said hydraulic motor means, and when said stepping motor is driven said valve member is moved to a hydraulic motor driven position for driving said frame along the trackway through said hydraulic motor means to the exclusion of said stepping motor.

2. In a wheeled frame riding on a trackway for movement along a predetermined path and having at least one of its wheels driven by hydraulic motor means, and a hydraulic system for actuating said motor means including a hydraulic liquid flow orienting means for controlling the flow of hydraulic liquid to and from the motor means, a drive control arrangement for controlling the operation of said flow orienting means and comprising:

a stepping motor assembly mounted on said frame for free floating shifting reciprocating movement in a path paralleling the trackway and including a stepping motor, a rack extending longitudinally of and coextensively with the trackway and fixed with respect to the trackway, said rack being aligned with the path of movement of the wheeled frame, a gear mounted for movement with said motor assembly and driven by said stepping motor, said gear being in meshing relation with said rack for rolling movement therealong when said stepping motor drives said gear in forward and reverse directions, said flow orienting means comprising:

a flow orienting valve including a housing made fast to said frame, a flow orienting valve mounted in said valve housing for movement between a central null position and hydraulic motor forward and reverse driving positions for driving said hydraulic motor means in forward and reverse directions, respectively, and means for biasing said valve member to its said null positions, with said valve member being connected to said stepping motor assembly for movement thereby when said stepping motor assembly moves in its path relative to said frame under the action of said gear rolling on said rack when said stepping motor is driven, and means for selectively driving said stepping motor in forward and reverse directions for selectively rotating said gear in alternate directions for effecting said rolling movement of said gear along said rack and corresponding movement of said motor assembly along its path relative to the frame against the action of said biasing means, whereby when said stepping motor is at rest, said valve member is held in its null position by said biasing means precluding driving of said motor means by said hydraulic system, and when said stepping motor is driven to drive said gear, said stepping motor assembly is moved relative to said frame by the rolling action of said gear on said rack to move said valve member to one of said driving positions whereby said hydraulic system drives said motor means to move said frame along the trackway to the exclusion of said stepping motor.

3. The drive control arrangement set forth in claim 2 wherein:

said valve is a four way control valve.

4. The drive control arrangement set forth in claim 2 wherein:

said selective driving means includes a programmable controller.

5. In a torch cutting apparatus comprising a cutting torch mounted on a wheeled frame riding in a trackway for torch cutting of a work piece positioned for torch cutting along the path of movement of the frame, with the frame wheels riding on a pair of track rails defining said trackway and one of the frame wheels of each rail being driven by hydraulic motor means, a hydraulic system for actuating said hydraulic motor means for driving said frame in either direction along said trackway including a hydraulic pressure liquid and a hydraulic pressure liquid flow orienting means for each hydraulic motor means for controlling the flow of the hydraulic pressure liquid to and from the respective motor means, the improvement wherein each flow orienting means has a drive control arrangement comprising:

a stepping motor assembly mounted on said frame for free floating shifting reciprocating movement in a path paralleling the trackway, and including a stepping motor, a rack extending longitudinally of and coextensive with the trackway and fixed with respect to the trackway, said racks being aligned with the path of movement of the wheeled frame, a gear mounted for movement with said motor assembly and driven by said stepping motor, said gear respectively being in meshing relation with the respective racks for rolling movement therealong when the respective stepping motors drive the respective gears in forward and reverse directions, said flow orienting means each comprising:

a servo valve made fast to the frame and having a first hydraulic motor driving position for driving said frame in one direction along said trackway, a null position, and a second hydraulic motor driving position for driving said frame in the other direction along said trackway, with said null position of said servo valve being intermediate said first and second hydraulic motor driving positions thereof, with said servo valves respectively being respectively connected to the respective stepping motor assemblies of the respective flow orienting means for movement thereby when the respective stepping motor assemblies move in their respective paths relative to said frame under the action of the respective gears rolling on the respective racks when the respective stepping motors are driven, means for biasing said servo valves to their respective null positions when said stepping motors are stopped, and means for selectively driving said stepping motors in forward and reverse directions for selectively and simultaneously rotating said gears in like alternate directions for effecting said rolling movement of said gears along the respective racks and corresponding movement of the respective motor assemblies along their respective paths relative to the frame against the action of the respective biasing means, whereby when said stepping motors are driven to drive said gears, said stepping motor assemblies are moved relative to said frame by the rolling action of said gears on said racks to position said servo valves for effecting driving of said motor means to move said frame along the trackway to the exclusion of said stepping motors and against the action of said biasing means, and when the driving of said stepping motors is stopped, said biasing means returns said servo valves to their null positions.

6. The improvement set forth in claim 5 wherein:

said selective driving means includes a programmable controler.

7. The improvement set forth in claim 5 wherein:

said frame includes a bridge structure extending transversely of said trackway and includes a trolley trackway in substantial parallelism therewith on which a wheeled trolley rides, said torch being mounted on said trolley for application to the work piece, with one of the trolley wheels being driven by hydraulic motor means, a hydraulic system for actuating said trolley hydraulic motor means for driving said trolley in either direction along said trolley trackway including a hydraulic pressure liquid and a hydraulic pressure liquid orienting means for said trolley motor means for controlling the flow of the trolley actuating hydraulic pressure liquid to and from said trolley hydraulic motor means, said trolley flow orienting means having a drive control arrangement comprising:

a stepping motor assembly mounted on said trolley for free floating shifting reciprocating movement in a path paralleling the trolley trackway, and including a stepping motor, a rack extending longitudinally of and coextensively with the trolley trackway and fixed with respect to the trolley trackway, said trolley trackway rack being aligned with the path of movement of the trolley, a gear mounted for movement with said trolley motor assembly and driven by said trolley stepping motor, said trolley gear being in meshing relation with said trolley rack for rolling movement therealong when said trolley stepping motor drives said trolley gear in forward and reverse directions, said trolley flow orienting means comprising:

a servo valve made fast to said trolley and having a first hydraulic motor driving position for driving said trolley in one direction along said trolley trackway, a null position, and a second hydraulic motor driving position for driving said trolley in the other direction along said trolley trackway, with said null position of said trolley servo valve being intermediate said first and second hydraulic motor driving positions thereof, with said trolley servo valve being connected to said trolley stepping motor assembly for movement thereby when said trolley stepping motor assembly moves in its path relative to said trolley under the action of said trolley gear rolling on said trolley rack when the trolley stepping motor is driven, means for biasing said trolley servo valve to its said null position, and means for selectively driving said trolley stepping motor in forward and reverse directions for selectively rotating said trolley gear for effecting said rolling movement of said trolley gear along said trolley rack and corresponding movement of said trolley motor assembly along its path relative to the trolley against the action of said trolley valve biasing means, whereby when said trolley stepping motor is driven to drive said trolley gear, said trolley stepping motor assembly is moved relative to said trolley by the rolling action of said trolley gear on said trolley rack to position said trolley servo valve for effecting driving of said trolley motor means to move said trolley along the trolley trackway to the exclusion of said trolley stepping motor and against the action of said trolley valve biasing means, and when the driving of said trolley stepping motor is stopped, said trolley valve biaing means returns said trolley servo valve to its null position.

8. The improvement set forth in claim 7 wherein:
said selective driving means includes a programmable controler for controlling the operation of said stepping motors.

9. In a frame riding on a trackway movable therealong, a hydraulic power means, and a hydraulic system for actuating said power means including a hydraulic liquid flow orienting means for controlling the flow of hydraulic liquid to and from the power means, a drive control arrangement for controlling the operation of said flow orienting means and comprising:

a stepping motor assembly mounted on said frame for free floating shifting rectilinear movement longitudinally of the trackway and including a stepping motor, a motion translating device driven by said stepping motor and including means for translating the drive of said stepping motor into motion of said assembly longitudinally of said trackway, said flow orienting means comprising a flow orienting valve including a housing made fast to said frame, a flow orienting valve member mounted in said housing and movable between null and hydraulic motor driving positions, and means for biasing said valve member to its said null position.

with said valve member being connected to said stepping motor assembly for movement thereby when said stepping motor assembly is moved relative to said frame under the action of said stepping motor driving said motion translating device, and means for driving said stepping motor, whereby when said stepping motor is at rest, said valve member is in its null position precluding driving of said hydraulic power means, and when said stepping motor is driven said valve member is moved to a hydraulic power means drive positin for moving said frame along the trackway through said hydraulic power means to the exclusion of said stepping motor.

10. The drive control arrangement set forth in claim 9 wherein:
said motion translating device is of the gear and rack type.

11. The drive control arrangement set forth in claim 9 wherein:
said motion translating device is of the nut and screw type.

12. The drive control arrangement set forth in claim 9 including:
means for selectively driving said stepping motor in forward and reverse directions and including a programmable controler therefor.

* * * * *